Dec. 17, 1929.  F. B. CONVERSE  1,740,155
ORGAN STOP CONTROL
Filed Dec. 26, 1928  7 Sheets-Sheet 1
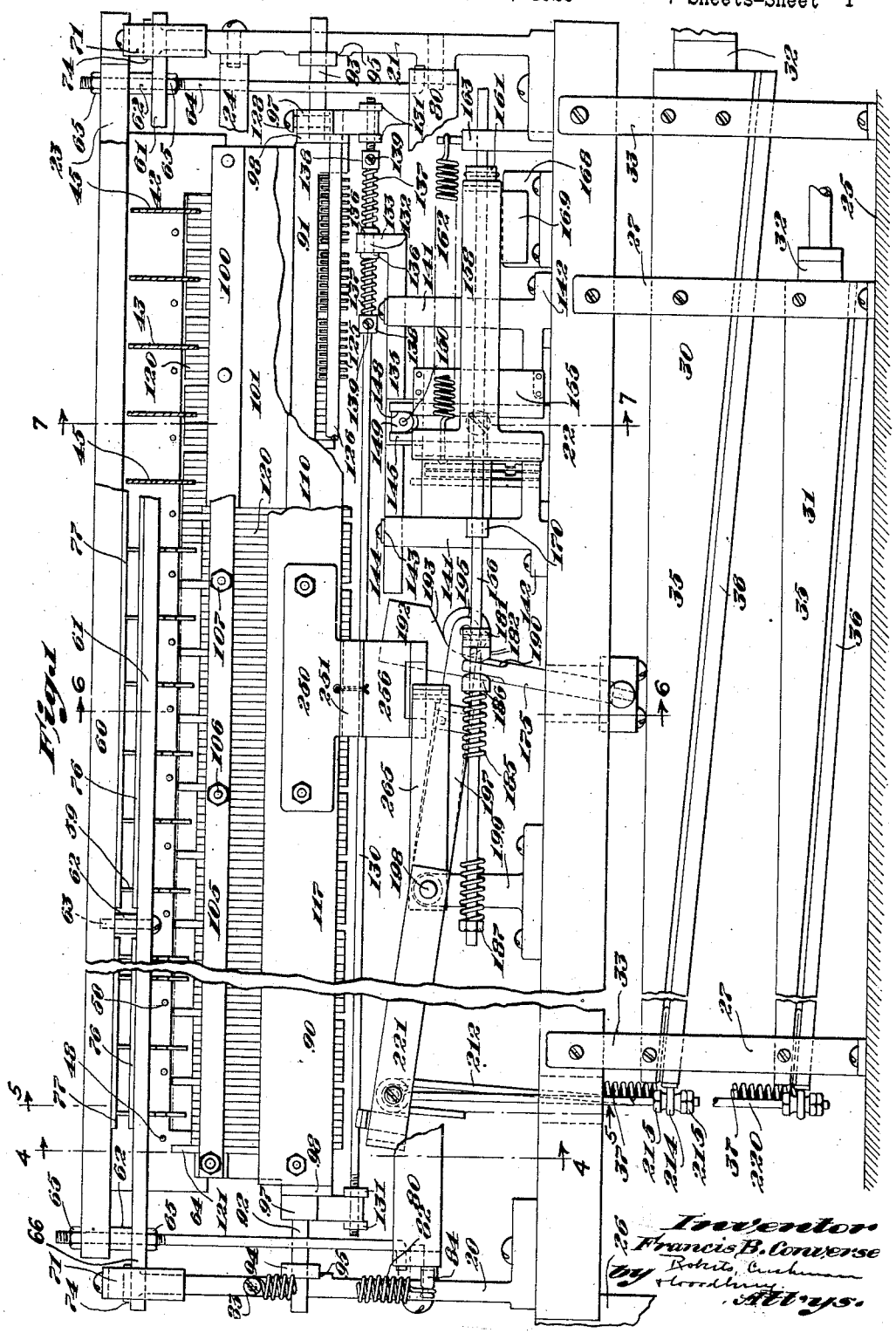
Inventor
Francis B. Converse Dec. 17, 1929.  F. B. CONVERSE  1,740,155
ORGAN STOP CONTROL
Filed Dec. 26, 1928  7 Sheets-Sheet 2
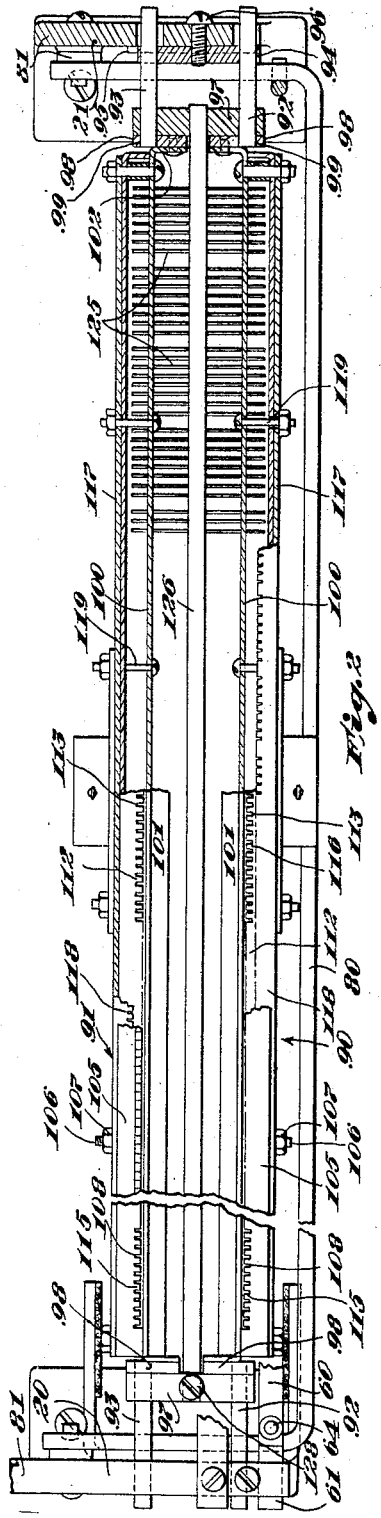
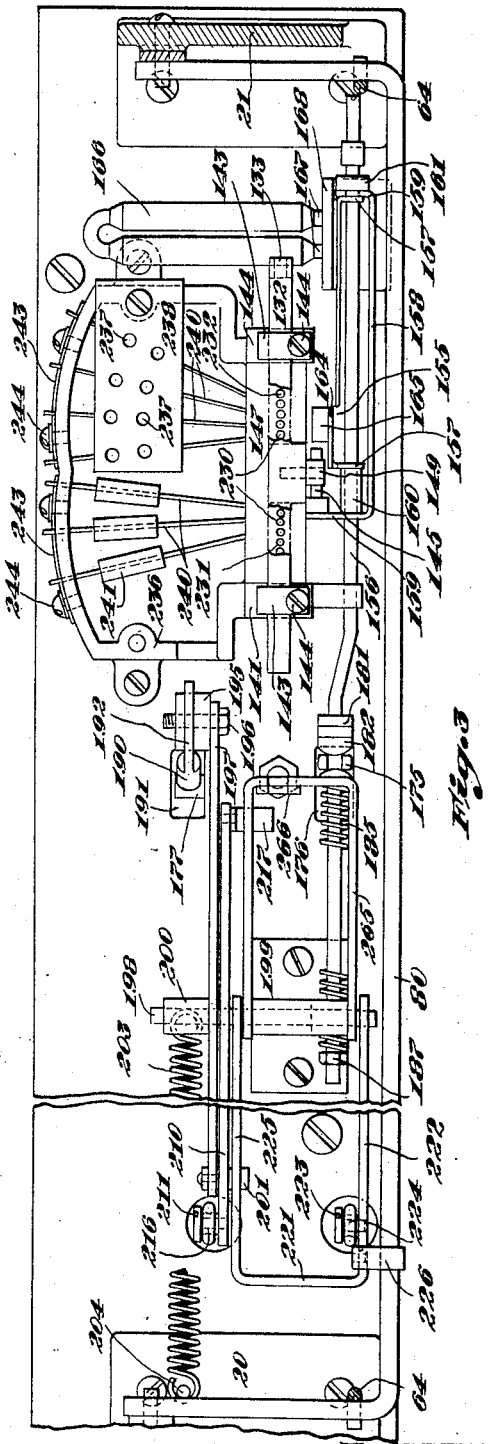
Inventor
Francis B. Converse
by Roberts, Cushman & Woodberry
Attys.

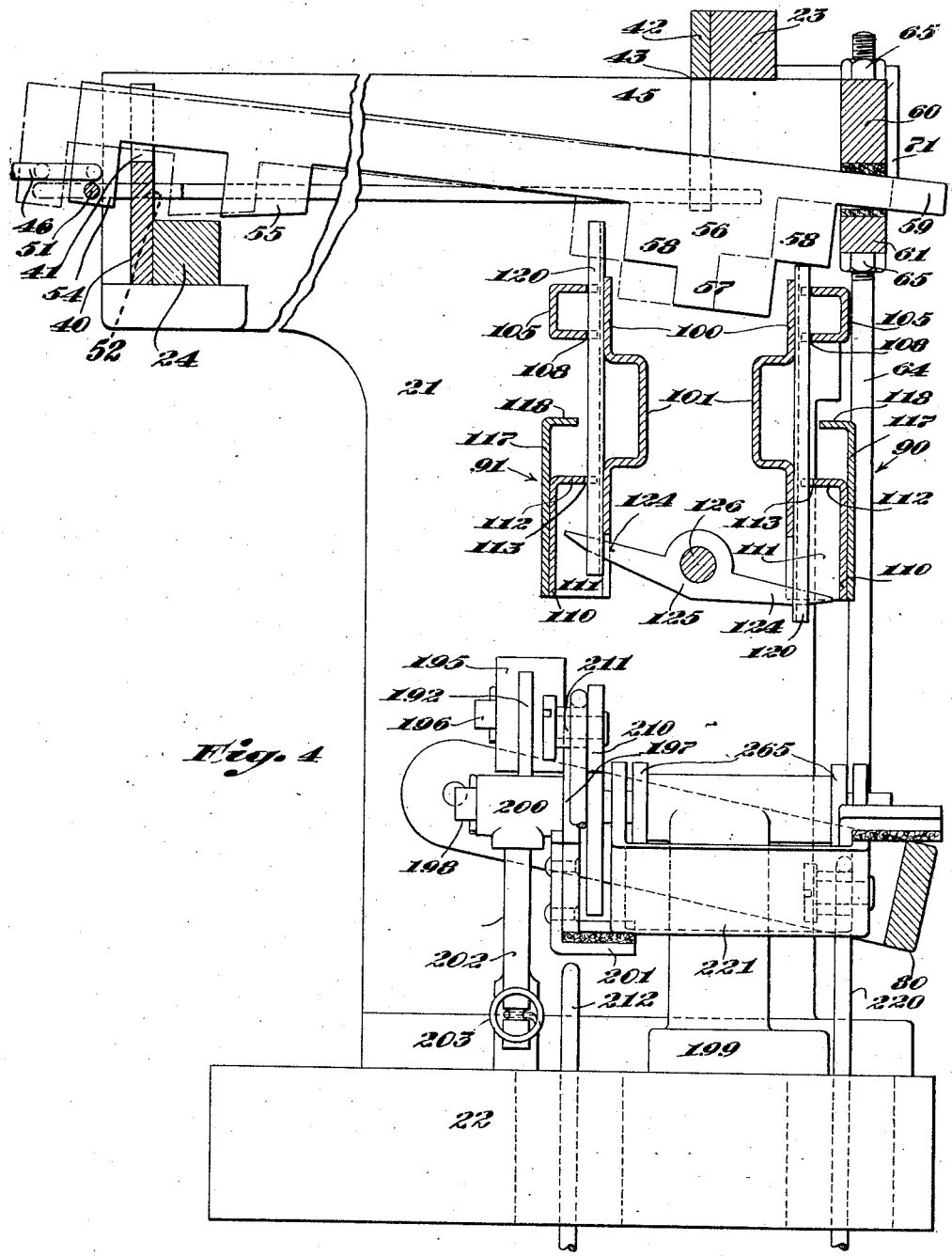

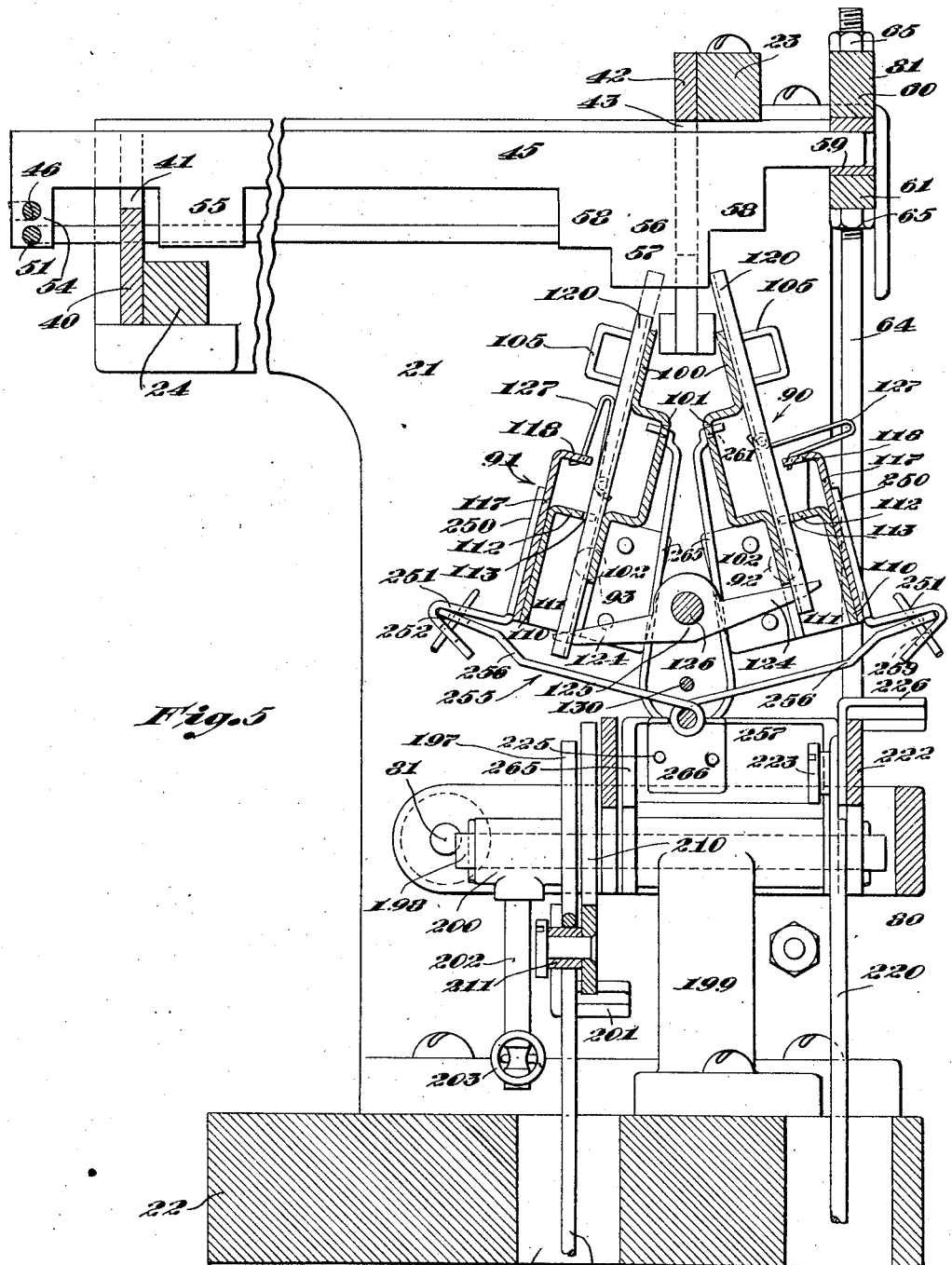

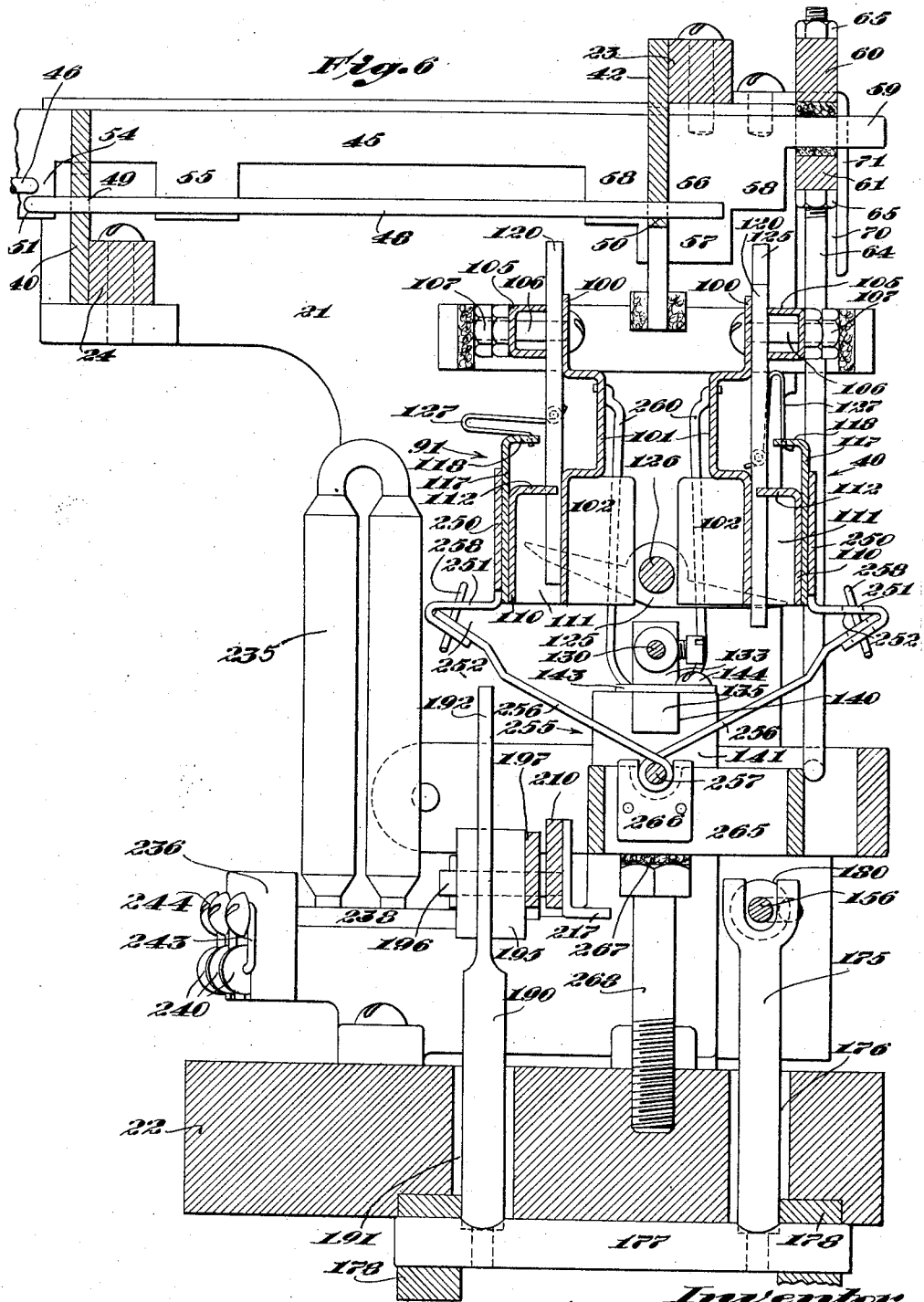

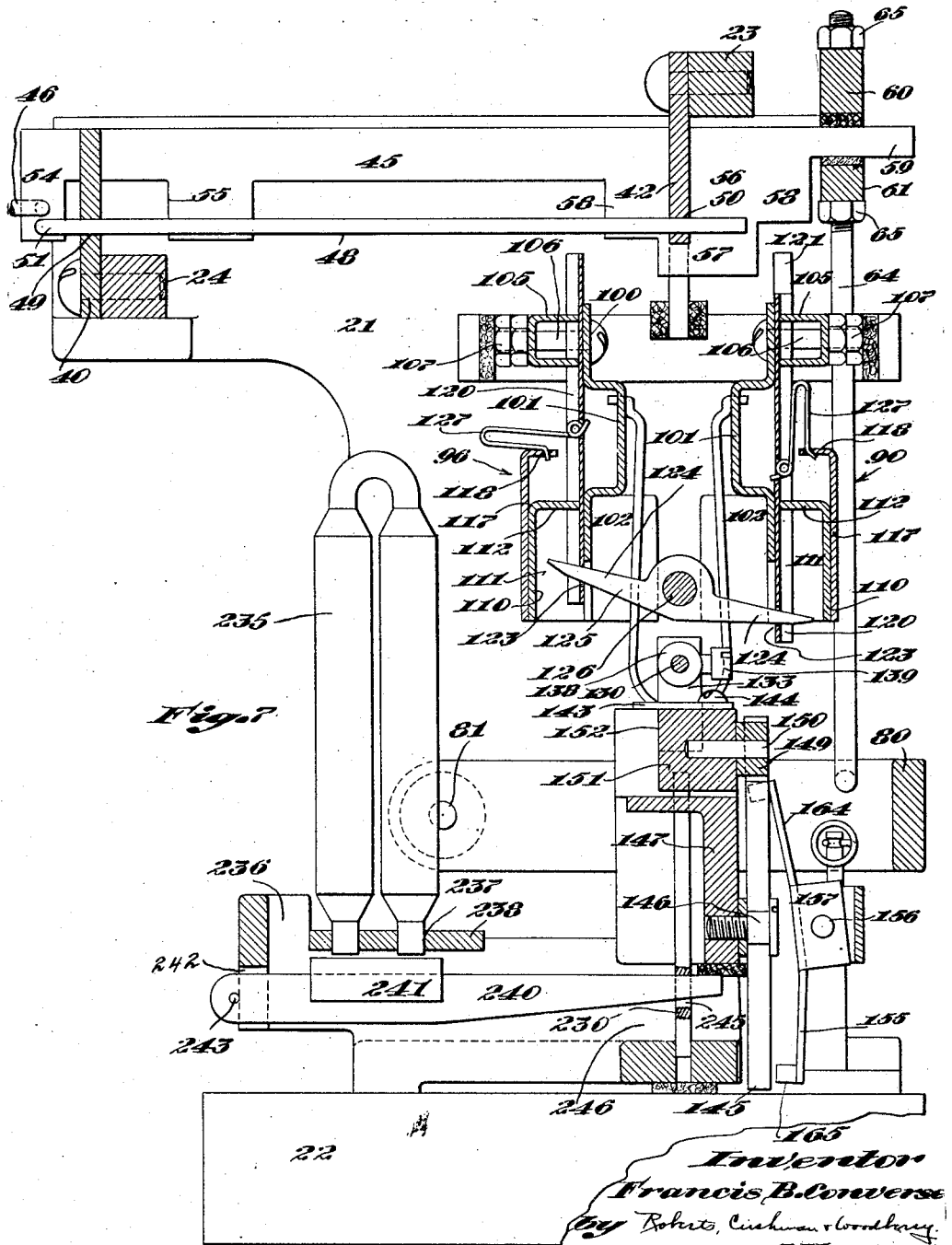

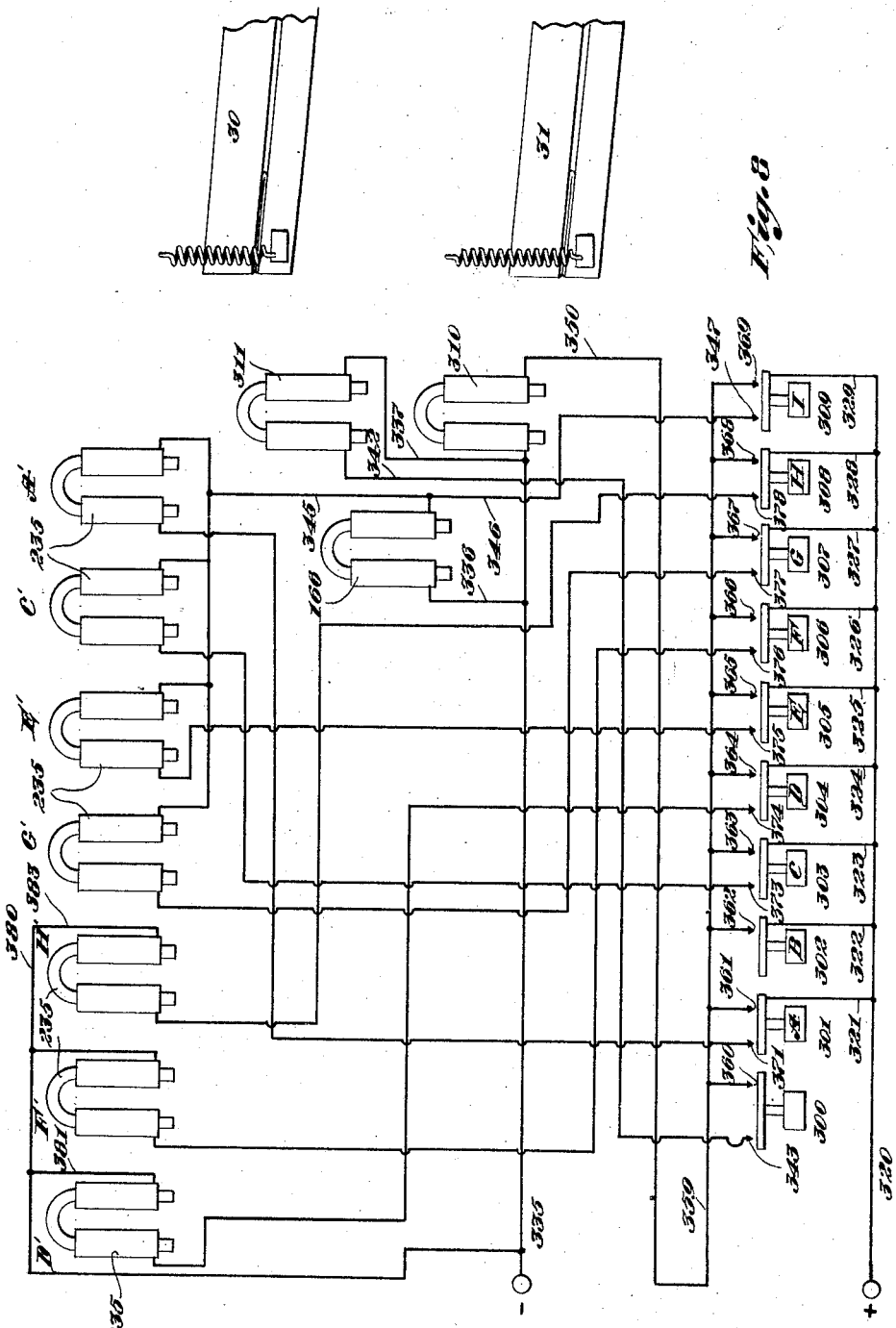

Patented Dec. 17, 1929

1,740,155

UNITED STATES PATENT OFFICE

FRANCIS B. CONVERSE, OF WESTPORT, CONNECTICUT, ASSIGNOR TO SKINNER ORGAN COMPANY, OF BOSTON, MASSACHUSETTS, A CORPORATION OF MASSACHUSETTS

ORGAN-STOP CONTROL

Application filed December 26, 1928. Serial No. 328,499.

This invention relates to an improvement in an organ stop control, more particularly in an organ stop control provided with a plurality of pistons or similar operating means whereby a plurality of stops can be shifted into the "on" position simultaneously upon the actuation of a single piston. With such mechanism the organist is enabled to "set up" in advance the combination of stops that he desires to use during the rendition of a selection or programme and instantly to bring into action, while playing, any one of the set up combinations by the actuation of a predetermined piston or operating means.

While mechanism of this general type is not new, it has previously been necessary to make the mechanism for large organs so big that it covers considerable space and must be shifted from the console into a separate compartment thus providing what is generally known in this art as remote control the mechanism being electrically operated through connections which must be taken from the stop knobs and pistons at the console.

The object of this invention is to provide a mechanism of this type which is simple and compact and which can be mounted within the console of the organ, thus eliminating the necessity of the connections required by the remote control. Other objects of this invention reside in the details of construction and in the co-action between the various elements as will appear from an examination of the following specification in connection with the drawings which form a part thereof, and in which Fig. 1 is a front elevation of one embodiment of this invention, certain parts being broken away for the purpose of clarity;

Figs. 2 and 3 are sectional plan views of the embodiment, certain parts being omitted or broken away in order to show the relation of the various elements more clearly;

Fig. 4 is a transverse sectional view taken along the line 4—4 of Fig. 1 and illustrating the position of certain elements at the time when they are being set for a certain operation;

Fig. 5 is a similar view taken along the line 5—5 of Fig. 1 illustrating the position of certain elements when the device is in the setting position;

Fig. 6 is a sectional view taken along the line 6—6 of Fig. 1 illustrating certain elements in their normal or idle position, one of the slides being shown in the advanced or "on" position;

Fig. 7 is a sectional view taken along the line 7—7 of Fig. 1 illustrating the device in a position similar to that shown in Fig. 6, but showing the mechanism for reciprocating the fan assembly; and Fig. 8 is a wiring diagram illustrating one way of carrying out the electrical connections necessary for the operation of the device.

The stop control mechanism selected as illustrating one embodiment of this invention comprises a pair of uprights or end plates 20 and 21 rigidly secured upon a platform 22, and connected at the top by a pair of cross bars 23 and 24. The platform 22 is supported upon a second platform 25 below and parallel to the first platform by an upright 26 and brackets 27.

Mounted between the platforms 22 and 25 are a pair of motors 30 and 31 which may be briefly described as of the familiar bellows type, having valves 32, each controlled by a magnet in such a manner that the energizing of the magnet by closing a circuit opens the valve to admit wind to the bellows, thus causing the bellows to swell and exert the required pull. When the circuit is broken the valve is closed and a passage to the atmosphere is opened allowing the wind to escape and thus permitting the bellows to return to their normal position. Since this construction is old and well known in the art, and since no novelty therein is claimed in connection with this invention, the motors 30 and 31 and the valves 32 are shown in elevation, no attempt being made to disclose the construction of the valves or the escape passages. The valves 32 instead of being mounted upon the motors 30 and 31 as shown in the drawings may be located relative to the motors in any convenient position and connected therewith by air tubes. The motor 30, which will hereafter be designated as the operating motor, and the motor 31, which will hereafter be designated as the setting motor, may be supported between the platforms 22 and 25 in any suitable manner. As here shown braces or brackets 33 are secured to the platforms and the motors are attached to such braces or brackets. Each motor comprises a stationary jaw 35 and a movable jaw 36 held normally in contact with the jaw 35 by suitable means such as a spring 37 attached at its lower end to the jaw 36 and at its upper end to the platform 22.

Rigidly secured to the rear cross bar 24 is a plate 40 having a series of equally spaced slots 41 therein. Depending from the front cross bar 23 is a plate 42 which is also provided with a plurality of slots 43. The slots 41 in the plate 40, and the slots 43 in the plate 42, are formed in alignment with each other, and as is clearly shown in the drawing, constitute fifteen pairs of slots. The slots receive fifteen slides 45, each of which is connected at its end by a rod 46 with a stop knob at the front of the console (not shown) which reciprocates the slide between the "off" position shown in Fig. 5 and the "on" position shown in Fig. 6. The slides 45 are guided for reciprocation in the slots 41 and 42 by rods 48 which pass through holes 49 and 50 provided in the rear and front plates 40 and 42 respectively. The rear end of each rod 48 is bent at right angles to pass through a hole 51 in the rear end of its slide 45 and then bent back parallel to the body of the rod and passed through a hole 52 in the plate 40. Each slide is thus pivoted upon a rod 48 so that its forward end may swing downwardly in the slot 43. All of the slides 45 are identical in construction, each having an integral projection 54 at the rear end in which the hole 51 is formed, a second projection 55 near the rear end, and a third projection 56 near the forward end. The projections 54 and 55 project below the slot 41 and will thus contact with the body of the plate 40 to limit the movement of reciprocation of the slide. The forward projection is within the slot 43 and is preferably formed with a central tongue 57 which extends beyond side members 58.

The forward tip 59 of each slide 45 extends between a pair of parallel bars 60 and 61, spaced a predetermined distance apart by means of collars 62. The bars are connected by suitable means here shown as comprising a pair of bolts 63 and a pair of rods 64 each passing through a collar 62. The upper end of each rod 64 is threaded to receive a pair of nuts 65 by which the bars 60 and 61 are clamped against the collar 62 and by which the bars 60 and 61 may be raised or lowered upon the rods 64. The ends 66 of the lower bar 61 project beyond the ends of the upper bar 60 and enter guide slots 70 formed at the front edge of the uprights 20 and 21 by means of downwardly extending right angle straps 71. The rods 64 are adapted to be reciprocated by means which will be described later, and the cross bars 60 and 61 caused to reciprocate as a unit in the guides 70. In order to insure silence in operation, leather pads 74 may be secured to the upper faces of the projecting ends 66 of the bar 61 to contact with the upper portion of the straps 71.

The tips 59 of the slides 45, as previously described, project into the space between the bars 60 and 61 and the collar 62 prevents any binding upon the slides 45 which would affect their free reciprocation between the bars. On the upper face of the lower bar 61 and on the under face of the upper bar 60 may be secured strips of leather, felt or similar material 76, 77 which prevent any contact of the slides with the bars. As previously pointed out, the slides 45 not only reciprocate in the slots 41 and 43, but also are free to move pivotally on the rods 48. This pivotal movement of the slide is caused by the reciprocation of the bars 60 and 61 by the rods 64. These rods are connected at their lower ends by, and are attached to, a U-shaped bar 80 which is pivotally supported at 81 on the uprights 20 and 21. A spring 82 which engages a pin 83 carried by the upright 20 and a bracket 84 carried by the bar normally act to hold the bars 60 and 61 in the upper limit of their position (see Fig. 6).

The reciprocation of the slides 45 by which the stops are controlled is effected by means of a pair of longitudinal members or "fans" 90 and 91 which are pivotally supported at their ends on rods 92 and 93. The rods 92 and 93, in the present embodiment, project through slots in the uprights 20 and 21 and are slidably supported in blocks 94 which enter guides 95 in the inner faces of the uprights 20 and 21. The blocks 94 are secured in the desired position in the guides 95 by screws or other suitable fastening means 96. The rods 92 and 93 are connected adjacent their inner ends by T-shaped blocks 97. Rigidly secured to each end of each fan is a plate 98 having an opening 99 which receives the end of the fan supporting rod 92 or 93 which projects beyond the inner face of the block 97.

The fans are identical in construction, and only one will be described in detail, the same reference characters, however, being applied to both. Each fan has a backing or inner plate 100 preferably provided with a longitudinally extending central rib 101 and terminating at each end in a flange 102 to which one of the plates 98 is attached. On the outer face of the backing plate 100 near the upper edge thereof is a U-shaped member 105 which is secured to the plate 100 at frequent intervals by means of bolts 106 and nuts 107. The inner edges of the U-shaped member 105 are provided with a plurality of slots 108 for a purpose to be described later. Removably secured to the outer face of the plate 100 near its lower edge is an angle strip 110 which is closed at each end by flanges 111 and secured to backing plate 100 by a nut and bolt construction 119 similar to that above mentioned. The edge of the horizontal portion 112 of the strip 110 is provided with a series of slots 113 which correspond in every particular with slots 108 in the member 105. The slots 108 and 113 thus define a series of tongues 115 and 116 which are spaced a short distance from the outer face of the back plate 100. A flanged strip 117 is mounted on the angle strip 110, its flange 118 projecting inwardly above the portion 112. The nut and bolt construction 119 mentioned above secures this strip also in place.

Mounted on both fans receiving the tongues 115 and 116 and entering the slots 108 and 113 are a plurality of movable pins 120 and, in the front fan only immovable pins 121 which are U-shaped in cross section. The immovable pins 121 are at the left end of the fan and every ninth pin thereafter divides the pins 120 which are free to reciprocate into fifteen groups each containing eight pins. The pins 120 are provided at their lower inner faces with slots 123 which slots receive the ends 124 of levers 125 which are pivotally supported upon a longitudinally extending rod 126. Each pin 120 of one fan is thus connected through a lever 125 with the corresponding pin in the other fan. Consequently the movement of any pin 120 must of necessity be in the opposite direction to the movement of the pin 120 to which it is connected by a lever 125 so that any pressure which initiates the depression of one pin will cause the elevation of its corresponding pin. The pins 120 are held in at one limit or the other by means of springs 127 which may be, as here shown, of the well known grasshopper type which engage slots in the pins and the flange 118 of the strip 117. The rod 126 which supports the levers 125 is rigidly secured by set screws 128 to the inner blocks 97.

The complete fan assembly is caused to reciprocate longitudinally in the machine, the rods 92 and 93 sliding in the blocks 94, by means acting upon a rod 130 which is rigidly and adjustably secured to the lower ends of the blocks 97 by means of a pair of nuts 131. The rod 130 passes through a hole 132 in the tip 133 of an operating slide bar 135. Movement is transmitted from the slide bar 135 to the rod 130 through washers 136, springs 137, and collars 138. The collars 138 are secured against movement of the rod 130 by means of set screws 139. The collars 138 are so adjusted that when the machine is at rest the washers 136 are yieldably held by the springs 137 in contact with the sides of the tip 133. The slide bar 135 reciprocates in notches 140 formed in the upper ends of a U-shaped block 141 which is rigidly secured to the platform 22, preferably by means of screws through outwardly projecting flanges 142. The slide bar is held in the notches 140 by means of cover plates 143 which extend across the mouths of the notches 140 and are secured to the block by screws 144. The slide bar 135 is reciprocated by a lever 145 pivotally mounted intermediate of its ends on a screw or a rivet 146 which enters a bar 147 supported between the legs of the block 141. The lever 145 is provided at its upper ends with a notch 148 which receives a pad 149 mounted upon a pin 150 carried by a lug 151 integral with the slide bar 135 and projecting forwardly and downwardly therefrom. Obviously the oscillation of the lever 145 will cause the reciprocation of the slide bar 135 and thence through the rod the reciprocation of the fan assembly.

The lever 145 is caused to oscillate by means of a T-shaped member 155 which is pivotally supported upon a rod 156. The member 155 has outwardly projecting flanges 157 one at each end thereof through which flanges the rod 156 passes. Mounted upon the rod 156 is a second T-shaped member 158 having flanges 159 at either end through which the rod 156 passes. The flanges 157 engage the rod 156 inside the flanges 159 and a collar 160 between the flanges 157 and 159 at the left in Fig. 3 causes the members 155 and 156 to reciprocate in unison. The member 158 is held with its right-hand flange 159 in contact with a nut 161 on the rod by means of a spring 162 attached at one end to the left flange 159 at the other end to the tip of a post 163 which guides the right end of the rod 156 (see Fig. 1). It will be noted from an examination of Fig. 3 that the lever 145 is located between the head 164 of the member 155 and the left flange 159 of the member 158.

The head 164 of the member 155 is slightly bowed as shown particularly in Fig. 7 and under the action of gravity normally assumes the position there shown with the upper end of the head adjacent the lever 145 and the lower end spaced therefrom. Pads 165 of leather or similar material are mounted upon the inner faces of the ends of the head 164 one of which pads will contact with the right face of one end of the lever 145 upon the positive reciprocation of the rod 156 to the left against the tension of the spring 162. The left flange 159 of the member 158 contacts with the left face of the lever 145 when the rod and members thereon are returned by the spring 162 to the normal position.

With the parts as shown in Fig. 7 it must follow that upon positive reciprocation of the rod 156 the member 155 will cause the upper end of the lever to move to the left (see Fig. 1) and so cause the fan assembly to reciprocate in that direction. The normal position of the fan assembly is approximately equidistant from its limits of reciprocation in order that its necessary travel be as short as possible and accordingly means must be provided to cause the assembly to reciprocate to the right as well as to the left. This result is obtained by rocking the T-shaped member 155 out of its normal position on the rod 156 so that the lower portion of the head 164 is swung inwardly and the pad 165 thereon, upon the positive reciprocation of the rod 156, will bear against the lower end of the lever 145 and move the lever and the fan assembly to the right instead of to the left.

In order to rock the member 155 on the rod 156 there is provided a magnet 166, the ends 167 of which extend through openings in a bracket 168 adjacent a tongue 169 depending from the T-shaped member 155. Obviously when the magnet 166 is energized it will draw the depending tongue 169 of the T-shaped member 155 toward the bracket 167, and rock the member 155 upon the rod 156 so that as long as the magnet is energized the positive reciprocation of the rod 156 will cause a reciprocation of the fan assembly to the right. The rod 156 is guided for its reciprocation by the post 163 and also by a bracket 170 projecting forwardly from one leg of the U-shaped block 141.

The rod 156 is caused to reciprocate by means of a lever 175 which projects through a slot 176 in the platform 22. The lower end of the lever is secured to a cross rod 177 adapted to oscillate in bearing blocks 178 fixed to the under side of the platform 22. The lever 175 has a recess 180 in its upper end through which the rod 156 passes. Fixed on the rod 156 by nuts 181 is a pad 182 with which one face of the lever 175 is normally held in contact by a coil spring 185. The spring surrounds the rod 156 bearing at one end upon a pad 186 to hold it in contact with the other face of the lever and at the other end against a nut 187 or similar adjusting means by which the tension of the spring 186 may be regulated.

Rigidly secured at its lower end to the cross rod 177 is a lever 190 parallel to the lever 175 and projecting through a slot 191 in the platform 22. The levers 175 and 190 being connected by the rod 177 to which they are rigidly secured thus function as a single unit. The lever 190 is provided at its upper end with an inclined cam-like projection 192 which may be integral therewith as shown in the drawings or be a separate element rigidly secured thereto. The projection 192 has an inclined face 193 in contact with which at all times is a roller 195 rotatably mounted upon a pin 196 carried by one end of a lever 197. The lever 197 is formed with a hub 200 which is pivotally supported on a rod 198 carried by a bracket 199 secured upon the upper face of the platform 22. At the opposite end of the lever 197 from the roller 195 is secured a forwardly projecting tongue 201. This tongue extends at right angles to the lever 197 and may be secured to it in any desired manner. In the present instance the tongue is a right angle member, the vertical leg of which is riveted to the rear face of the lever 197 (see Fig. 4). Rigidly attached to the hub 200 is an arm 202 connected by a spring 203 with a post 204 on the upright 20. The spring 203 acts to hold the lever 197 normally in the position shown in Fig. 1 with the end carrying the roller 195 depressed.

The lever 197 is rocked on the rod 198 by either the operating motor 30 or the setting motor 31 causing the roller 195 to bear against the face 193 and actuate the lever 190. Through the lever 175 by the connections previously described, this movement of the lever 190 will cause a reciprocation of the fan assembly.

The lever 197 is actuated by the operating motor 30 through a lever 210 which is pivotally mounted upon the rod 198. The left end of the lever 210 extends over the forwardly projecting tongue 201, and from it projects a button 211. A rod 212 is adjustably secured to the movable side plate of the motor 30 by any suitable means such as by passing the rod through the opening in an eyelet 214 and providing nuts 215 on the rod on either side of the eyelet. The rod 212 passes through a slot 213 in the platform 22 and its upper end 216 is bent back to form a loop defined by parallel portions of the rod (see Fig. 1) which surrounds the button 211. The lever 197 being held by the spring 203 in the normal position shown in Fig. 1, the tongue 201 will act upon the lever 210 to hold it in a similar position. The lever 210 when actuated by the motor 30 through the rod 212 bears upon the tongue 201 and depressing the left end of the lever 197 moves it out of its normal position and thereby operates the lever 190. At the end of the lever 210 is secured a forwardly projecting finger 217, the purpose of which will be described below.

The lever 197 is actuated by the setting motor 31 through a rod 220 and a U-shaped lever 221 pivotally supported at its inner ends on the rod 198. The rod 220 is secured at its lower end to the movable side plate of the motor by means similar to those employed to secure the rod 212 to the motor 30. The leg 222 of the lever 221 is provided with a button 223 around which the loop 224 at the upper end of the rod 220 is passed. The tongue 201 extends below the leg 225 of the lever 221 and thus holds it normally parallel to the levers 197 and 210. Obviously, when the motor 31 is actuated the lever will be depressed out of the normal position shown in Fig. 1, and acting upon the tongue 201 will cause the lever 197 to actuate the lever 190. The U-shaped lever 221 is also provided with a forwardly projecting finger 226 which is carried by the leg 222 of the lever. This finger extends over the U-shaped bar 80 previously described so that when the motor 31 operates it not only causes fan assembly to shift longitudinally through the mechanism thus described, but, by reason of its contact with the U-shaped bar 80 will depress the bars 60 and 61 which control the forward ends of the slides 45.

The extent of the longitudinal movement of the fan assembly is controlled by a plurality of stop pins 230, 231 and 232. These pins are arranged in a row in the bar 147 carried between the legs of the block 141 and in the present instance are nine in number. The stop pins 231 and 232 at the ends of the row are rigidly mounted in the bar and project above the upper face thereof to act as permanent limits to the movement of the fan assembly. The other seven stop pins 230 are reciprocable and are arranged in two groups, one containing three pins, and the other containing four pins. Referring to Fig. 3 it will be noted that these groups are on opposite sides of the normal position of the lug 151 on the bar 135, the group containing four movable pins being at the right as shown in Fig. 1. The stop pins 230 are vertically movable in the bar 147, and such movement is controlled by a plurality of magnets 235. These magnets are suitably placed in a frame 236 carried by the platform 22 the legs of the magnets projecting through holes 237 in a plate 238 carried by the frame and spaced a suitable distance above the platform. Pivotally mounted in the frame 236 are a plurality of levers 240 which extend below the plate 238, each lever being provided with an iron strip 241 which is located below the legs of one of the magnets and acts as an armature therefor. The inner ends of the levers enter slots 242 formed in the frame 236 and are pivoted upon wires 243 attached to the frame by screws 244. The outer ends of the levers extend through notches 245 formed in the movable stop pins 230, and obviously when any one of the magnets 235 is energized the lever 240 corresponding thereto is caused to turn on its pivot, and the pin to which it is connected is lifted above the surface of the bar 147 into the path of the block 151. The raised pin, therefore, will stop the movement of the fan assembly in the direction which it is caused to take by the mechanism previously described before it reaches the limit determined by the pin 231, or 232.

It has already been stated that the fan assembly has a movement in either direction from its normal position, and the control of the direction of movement by the T-shaped member 155 and the magnet 166 has been set forth at length. The magnet 166 is connected in series with each of the magnets 235 which control the four stop pins in the group at the right. Consequently when one of these four magnets 235 is energized to raise a stop pin the magnet 166 is also energized and the fan assembly is reciprocated to the right until stopped by the raised pin. The movement of the lever 175 is uniform under all conditions, and the coil spring 185 surrounding the rod 156 which carries the T-shaped member 155 absorbs any further movement when the fan assembly is stopped short of its full travel.

In addition to the longitudinal movement of the fan assembly the fans 90 and 91 have a rocking movement on the rods 92 and 93 toward and from each other. Secured to the face of each flanged strip 117 is a plate 250 which includes a right angular projection 251 forming a pocket 252. Carried by the pockets 252 is a lever 255 made up of two plates 256 hingedly connected together on a pin 257. The free ends of the plates 256 enter the pockets 252 and are secured therein preferably by means of pins 258 which extend through slots 259 formed in the plates and in the walls of the pockets. The fans are normally held in the position shown in Fig. 6 by means of a U-shaped spring 260 which, as shown in that figure, enters openings 261 in the longitudinally extending ribs 101.

Obviously upward pressure applied to the hinged ends of the plates 256 will cause the lever 255 to open and bearing upon the plates 250 tilts the fans toward each other. This movement of the lever 255 is obtained by means of a U-shaped lever 265 which is pivotally supported upon the rod 198 and carries a saddle 266 which receives the hinged ends of the plates 256. The lever 265 normally rests by gravity on a pad 267 carried upon a support 268 adjustably secured upon the platform 22. The lever 265 is raised out of this normal position by the finger 217 carried by the lever 210 previously described which contacts with one leg of the lever 265. The motor 30 in actuating the lever 210 thus actuates the lever 265 and thereby not only causes the fan assembly to reciprocate but also causes the fans to rock toward each other, the rocking movement taking place after the reciprocating movement has been completed.

The operation of the motors 30 and 31 is electrically controlled in any suitable manner. One form is illustrated diagrammatically in Fig. 8 of the drawing to which attention is called at this time. There are provided at the front of the console, in any convenient place, a series of buttons or pistons here designated by the numeral 300 to 309 inclusive. The piston 300 will hereafter be referred to as the setting piston, the pistons 301 to 308 inclusive as combination pistons, and the piston 309 as the cancelling piston. The operating motor 30 is controlled by a magnet 310, and the setting motor 31 is controlled by a magnet 311.

The electrical current enters from a source of power through a lead 320 which is connected to the pistons 301 to 309 inclusive by leads 321 to 329 inclusive. The negative lead 335, through which the current returns to the source of power, is connected by a lead 336 to one pole of the magnet 116 by a lead 337 to one pole of the magnet 311 and is directly connected to one pole of the magnet 310. The other pole of the magnet 311 is connected by lead 342 to a contact 343 acted upon by the piston 300, as will be pointed out below. The other pole of the magnet 166 is connected by a lead 345 with one pole of each of the four magnets 235 at the right side of the machine, and by a lead 346 with a contact 347 adjacent the cancelling piston 309. The other pole of the magnet 310 is connected by a lead 359 with contacts 360 to 369 inclusive, which contacts are adjacent the pistons 300 to 309 inclusive.

Each of the combination pistons, with the exception of piston 302, controls one of the movable stop pins 230 through its magnet 235 being connected with one pole thereof by leads terminating in contacts 371 and 373 to 378 inclusive adjacent the pistons. Thus, if we designate the combination pistons 301 to 308 inclusive arbitrarily by the characters A, B, C, D, E, F, G, and H, the magnets controlled by the pistons will be similarly designated A′, C′, D′, E′, F′, G′, and H′. The piston 302 or B is not connected to a magnet, and when it is depressed, will cause the lever 145 to carry the fan assembly to the left until the lug 151 bears against the fixed stop pin 231. The cancelling piston 309 energizing the magnet 116 will cause the lever 145 to carry the fan assembly to the right until the lug 151 bears against the fixed stop pin 232. These operations are in addition to the action of any of the pistons 300 to 309 inclusive which will act through the electrical connections thus briefly described to energize one of the motors 30 and 31.

A depression of any of the pistons 301 to 309 inclusive will permit the current in the lead 320 to pass through one of the contacts 361 to 369 inclusive to the lead 359 and thence through the magnet 310 which is in series to the negative lead 335. The energizing of the magnet 310 actuates the motor 30 which, through the connections previously described, reciprocates the fan assembly to the limit of its reciprocation and then causes the fan blades to rock toward each other. The limit and direction of movement of the fan assembly is, of course, controlled by the stop pins 230 through the magnets 235, or by the stop pins 231 and 232 and by the magnet 166. The depression of the pistons 301, 303, 305, and 307, or in the other words A, C, E and G causes, through the connections above described, the energizing of the magnet 166 and the magnets 235 corresponding with the pistons, that is, A′, C′, E′ and G′. The current passing to one pole of the magnets through the contacts 371, 373, 375 and 377 is returned through the lead 345 connected to the other pole to the negative lead 335 through the magnet 166 and the lead 336. Thus, the depression of any of these four combination pistons energizes the magnet 166, tilting the T-shaped member 155 and causing the lever 145 to carry the fan assembly to the right. The cancelling piston 309 when depressed energizes the magnet 166 through the contact 347, and leads 346, 336 and 335 so that the fan assembly reciprocates to the right until checked by the contact of the pin 232 with the lug 151.

It will be noted that upon the depression of any one of the pistons 301 to 309 the current passes directly through the lead 359 to the motor 30. If, however, the setting piston 300 is depressed at the same time that one of the pistons 301 to 309 inclusive is depressed, current will be diverted from the lead 359 through the contacts 360 and 343 to the lead 342 thus causing the energization of the magnet 311 which actuates the setting motor 31. From the construction previously described, the actuation of the motor 31 causes the fan assembly to reciprocate in the desired direction, and after that position has been reached, causes a depression of the bars 60 and 61 giving the pivotal movement to the slides 45.

It will be noted that the number of paired pins 120 in each of the fifteen groups is the same as the number of combination stops 301 to 308 inclusive. It will be further noted that the stop pins 230, 231 and 232 are so arranged that when the fan assembly reaches the limit of reciprocation determined by any of the stop pins, one pair of pins 120 of each group is directly below a slide 45, the pins of the pairs on the front fan being in front of the tongues 57 and the pins of the pairs on the rear fan being behind the tongues. For instance, when the cancelling piston 309 is depressed the fan assembly is so positioned by the stop 232 that the immovable pins 121 of the front fan are below the slides 45. Similarly the piston A brings the left pairs of pins 120 of each group below the slides 45 and the piston B brings the right pair of pins of each group below the slides. The order of the operation of the pistons to bring the pins of each group seriatim below the slides is as follows: A, C, E, G, H, F, D and B.

The location of the slides 45 in the "off" position as shown in Fig. 5 or in the "on" position as shown in Fig. 6 is initially determined by the manipulation of the stop knobs. After the proper stops desired to form a combination have been drawn, those slides 45 corresponding thereto are in the "on" position. When the motor 31 is operated by the setting piston 300 and one of the combination pistons, A for example, the bars 60 and 61 depress the forward ends of the slides so that the side members 58 of the slides will bear down upon the pins directly below them as shown in Fig. 4, and will depress any of the pins that may be raised and will raise the paired pin in the other fan. The forward members 58 of the "on" slides extend over and bear upon the pins in the forward fan while the rear members 58 of the "off" slides as indicated in dotted lines in Fig. 4, extend over and bear upon the pins in the rear fan. The result of this construction and operation is that the pins of the forward fan corresponding to the "off" slides and the pins of the rear fan corresponding to the "on" slides are raised while the pins paired with the raised pins are depressed.

The pins remain in the position set by the slides until positively shifted for the purpose of changing the composition of the group forming the combination. Consequently each time the motor 30 is actuated by depressing the piston A alone, the fan assembly will return to the same position and upon the rocking of the fans the raised pins in the forward fan will engage the tongues 57 of the corresponding slides and in case the slides are "on" will move them "off" while the raised pins on the rear fan will act upon the tongues 57 of the slides that correspond thereto, and in case they are "off" will move them "on". All the combination pistons operate in the same manner as the piston A just described. The paired pins of the various groups controlled by any piston operate independently of the remaining pins and consequently it is possible to arrange eight combinations of stops.

When it is desired to reset or alter the composition of the stops in any combination, the knobs of the desired stops are manipulated, and the setting piston 300 is depressed and while depressed the piston controlling the combination to be changed is depressed. This results in a repetition of the setting operation previously described and a relocation of the pins in the fans.

The stops may all be thrown "off" at any desired time by depressing the cancelling piston 309. This piston, as has been previously described, causes the immovable pins 121 to correspond with the slides 45 and consequently after the fans are rocked the slides will all be "off". Since there are no pins in the rear fan paired with the movable pins 121, there will be no interference to this reciprocation of the slides 45. The cancelling operation does not in any way impair the setting of the pins 120 in the fans so that upon depression of any combination piston, the stops will again be "on" in the desired combination.

The mechanism hereinbefore described and illustrated in the drawings is designed to operate and control 15 different stops which can be arranged in eight combinations set up or varied at will by the organist, and may be employed in the following manner:

The organist before rendering a piece selects the group of stops which he desires to use in combination while playing the various passages of the piece. He sets these stops by manipulating the usual stop knobs at the front of the console and such manipulation will shift the slides controlled by the manipulated knobs. The knobs of the stops not to be used are, of course, in the "off" position, and the slides controlled by such knobs remain in the retracted position shown in dotted lines in Fig. 4. After setting the stops desired to form the combination, he depresses the setting piston 300 and then depresses one of the combination pistons, let us say for example piston A. By these two pistons the motor 31 is actuated which first reciprocates the fan assembly into a position determined by the stop pin controlled by the selected piston and after the fan assembly has been reciprocated to this predetermined position, the motor causes the bars 60 and 61 to descend bringing the "on" slides into contact with the pins 120 on the front fan directly below them, the contacted pins in the front fan are thereupon depressed and the paired pins in the rear fan are raised. It will be noted from an examination of Fig. 4 that the rear portions 58 of the "off" slides 45 contact with the pins 120 below them in the rear fan so that in case of any of those pins are raised they will be depressed and the paired pins in the front fan raised. After this operation is completed, the pistons 300 and 301 are released and the parts of the device return to their normal position except the slides 45 and pins 120. Other combinations of stops are selected by the organist and registered by the depression of the setting piston 300 with other combination pistons. Only eight combinations can be set up with the present embodiment, but it is obvious that an increase in the number of combination pistons can be made without departing from the spirit and scope of the invention.

After the organist has arranged the stops in the various combinations he desires, he is then ready to play the organ. When he desires that the combination of stops controlled by piston A, for instance, should be "on" he depresses that piston alone. The depression of the piston by the means previously described actuates the motor 30 causing the fan assembly to reciprocate into the position predetermined by the stop pin controlled by the combination piston, and then causing the fan to rock toward each other. When this rocking movement takes place, the pins 120 in the fans below the slides 45 act upon the slides and move them into the position determined by the arrangement of the pins on the blade, that is to say, the pins on the front blade which are raised will act upon any slide 45 that may be in the "on" position and move them into the "off" position, and any pins 120 which may be standing in the rear fan will contact with the other slides to move them into the "on" position. This operation takes place very quickly and the stops are then set as desired for the particular combination. When it is desired to employ another combination, the piston controlling that combination is depressed and the operation previously described takes place, the slides 45 being rearranged in accordance with the location of the pins which has previously been obtained by the setting operation. When it is desired to cancel all the stops the slides 45 are moved into the "off" position by depressing the piston 309 which acutates the motor 30 reciprocating the fan assembly until the lug 151 contacts with the fixed stop pin 232, and after this position is reached rocking the fans in the usual way. In this position, as previously pointed out, the fixed pins 121 correspond to the slides 45 and obviously when the fans are rocked the fixed pins will engage the slides and move them all into the "off" position.

While one embodiment of this invention has been shown and described, I am not limited thereto since other embodiments can be made without departing from the spirit and scope thereof as set forth in the following claims.

I claim:

1. An organ stop control mechanism comprising a plurality of reciprocable stop control slides, a pair of pivotally mounted fans, pins slidably mounted in the fans each pin in one fan being so connected with the opposite pin in the other fan that when one pin is raised its opposite pin is lowered and means for reciprocating the fans as a unit until certain pins in the fans correspond to the slides and for rocking the fans to bring the pins into engagement with the slides.

2. An organ stop control mechanism comprising a plurality of reciprocable stop control slides, a pair of pivotally mounted fans, pins slidably mounted in the fans each pin in one fan being so connected with the opposite pin in the other fan that when one pin is raised its opposite pin is lowered, means for reciprocating the fans as a unit until certain pins in the fans correspond to the slides and for rocking the fans to bring the pins into engagement with the slides, and means for predeterminedly limiting the reciprocation of the fans as a unit.

3. An organ stop control mechanism comprising a plurality of reciprocable stop control slides, a pair of pivotally mounted fans, pins slidably mounted in the fans each pin in one fan being so connected with the opposite pin in the other fan that when one pin is raised its opposite pin is lowered, means for reciprocating the fans as a unit until certain pins in the fans correspond to the slides and for rocking the fans to bring the pins into engagement with the slides, means for predeterminedly limiting the reciprocation of the fans as a unit and a plurality of elements, the actuation of any one of such elements controlling the operation of both said means.

4. An organ stop control mechanism comprising a plurality of reciprocable stop control slides, a pair of pivotally mounted fans, pins slidably mounted in the fans, means for reciprocating the fans as a unit until certain pins in the fans correspond to the slides and means for depressing the forward ends of all the slides in unison into engagement with such pins.

5. An organ stop control mechanism comprising a plurality of reciprocable stop control slides, a pair of pivotally mounted fans, pins slidably mounted in the fans, means for reciprocating the fans as a unit until certain pins in the fans correspond to the slides, means for depressing the forward ends of all the slides in unison into engagement with such pins and means for predeterminedly limiting the reciprocation of the fans as a unit.

6. An organ stop control mechanism comprising a plurality of reciprocable stop control slides, a pair of pivotally mounted fans, pins slidably mounted in the fans, means for reciprocating the fans as a unit until certain pins in the fans correspond to the slides, means for depressing the forward ends of all the slides in unison into engagement with such pins, a plurality of elements and a single element, the actuation of any one of such plurality of elements in conjunction with the actuation of the single element controlling the operation of both said means.

7. In an organ control mechanism a pair of fans, and pins mounted to reciprocate in the fans, each pin in one fan being so connected with the opposite pin in the other fan that when one pin is raised its opposite pin is lowered.

8. In an organ control mechanism a pair of fans, and pins mounted to reciprocate in the fans, each pin in one fan being so connected with the opposite pin in the other fan that when one pin is raised its opposite pin is lowered, and a plurality of pins mounted immovably in one fan separating the reciprocable pins into groups, there being no pins in the other fan opposite the immovable pins.

9. In an organ stop control mechanism, a plurality of slides independently reciprocable and pivotally mounted so that the forward ends may be depressed in unison, a pair of fans, reciprocable as a unit and mounted to have a rocking movement toward and from each other, a motor for reciprocating the fans as a unit and causing them to rock toward and from each other and a motor for reciprocating the fans as a unit and for depressing the forward ends of said slides in unison.

10. In an organ stop control mechanism, a plurality of slides independently reciprocable and pivotally mounted so that the forward ends may be depressed in unison, a pair of fans, reciprocable as a unit and mounted to have a rocking movement toward and from each other, a motor for reciprocating the fans as a unit and causing them to rock toward and from each other, a motor for reciprocating the fans as a unit and for depressing the forward ends of said slides in unison, a plurality of elements any one of which will actuate the first-named motor and a single element the operation of which in conjunction with any one of the plurality of elements will actuate the second-named motor.

11. In an organ stop control mechanism, stop control slides, fans mounted to move longitudinally and provided with pins for engaging the slides, and means for moving the fans in either direction from its position of rest to the required position for engaging the fans.

Signed by me at Boston, Massachusetts, this 21st day of December, 1928.

FRANCIS B. CONVERSE.